United States Patent
Cai et al.

(10) Patent No.: US 11,231,740 B2
(45) Date of Patent: Jan. 25, 2022

(54) CLOCK RECOVERY USING BETWEEN-INTERVAL TIMING ERROR ESTIMATION

(71) Applicant: CREDO TECHNOLOGY GROUP LIMITED, Grand Cayman (KY)

(72) Inventors: Fang Cai, San Jose, CA (US); Junqing Sun, San Jose, CA (US); Haoli Qian, San Jose, CA (US)

(73) Assignee: CREDO TECHNOLOGY GROUP LIMITED, Grand Cayman (KY)

( * ) Notice: Subject to any disclaimer, the term of this patent is extended or adjusted under 35 U.S.C. 154(b) by 388 days.

(21) Appl. No.: 16/269,491

(22) Filed: Feb. 6, 2019

(65) Prior Publication Data

US 2020/0249714 A1    Aug. 6, 2020

(51) Int. Cl.
| | |
|---|---|
| *G06F 1/06* | (2006.01) |
| *H04L 7/027* | (2006.01) |
| *G06F 11/16* | (2006.01) |
| *G06F 13/42* | (2006.01) |
| *G06F 1/08* | (2006.01) |
| *G06F 15/173* | (2006.01) |

(52) U.S. Cl.
CPC ............ *G06F 1/06* (2013.01); *G06F 11/1604* (2013.01); *H04L 7/027* (2013.01); *G06F 1/08* (2013.01); *G06F 13/4291* (2013.01); *G06F 15/17325* (2013.01)

(58) Field of Classification Search
CPC .. G06F 1/08; G06F 15/17325; G06F 13/4291; G06F 1/06; G06F 11/1604; H04L 7/027

USPC .......................................... 713/400, 500, 503
See application file for complete search history.

(56) References Cited

U.S. PATENT DOCUMENTS

| | | | |
|---|---|---|---|
| 8,301,036 B2 | 10/2012 | He | |
| 9,071,479 B2 | 6/2015 | Qian et al. | |
| 9,935,800 B1 | 4/2018 | He | |
| 2002/0141434 A1* | 10/2002 | Grundvig | H04J 3/0605 370/442 |
| 2009/0110115 A1* | 4/2009 | Dally | H04L 7/033 375/316 |
| 2009/0237138 A1* | 9/2009 | Shanbhag | H03D 13/003 327/231 |
| 2011/0008059 A1* | 1/2011 | Chang | H04B 10/25073 398/202 |

(Continued)

OTHER PUBLICATIONS

Musa, Faisal A.; Thesis: High-speed baud-rate clock recovery; University of Toronto; 2008.

(Continued)

*Primary Examiner* — Ji H Bae
(74) *Attorney, Agent, or Firm* — Ramey & Schwaller, LLP

(57) ABSTRACT

Disclosed clock recovery modules provide improved performance with only limited complexity and power requirements. In one illustrative embodiment, a clock recovery method includes: oversampling a receive signal to obtain mid-symbol interval (MSI) samples and between-symbol interval (BSI) samples; processing at least the MSI samples to obtain symbol decisions; filtering the symbol decisions to obtain BSI targets; determining a timing error based on a difference between the BSI samples and the BSI targets; and deriving from the timing error a clock signal for said oversampling.

14 Claims, 3 Drawing Sheets

(56) References Cited

U.S. PATENT DOCUMENTS

2012/0290885 A1* 11/2012 Mobin .................. H04L 7/0337
714/56

OTHER PUBLICATIONS

Mueller, Kurt H., et al., Timing Recovery in Digital Synchronous Data Receivers, IEEE Transactions on Communications, May 1976, 516-531, vol. Com-24, No. 5.
Unpublished U.S. Appl. No. 16/110,594, filed Aug. 23, 2018.

* cited by examiner

CLOCK RECOVERY USING BETWEEN-INTERVAL TIMING ERROR ESTIMATION

BACKGROUND

Digital communications occur between sending and receiving devices over an intermediate communications medium, or "channel" (e.g., a fiber optic cable or insulated copper wires). Each sending device typically transmits symbols at a fixed symbol rate, while each receiving device detects a (potentially corrupted) sequence of symbols and attempts to reconstruct the transmitted data. A "symbol" is a state or significant condition of the channel that persists for a fixed period of time, called a "symbol interval." A symbol may be, for example, an electrical voltage or current level, an optical power level, a phase value, or a particular frequency or wavelength. A change from one channel state to another is called a symbol transition. Each symbol may represent (i.e., encode) one or more binary bits of the data. Alternatively, the data may be represented by symbol transitions, or by sequences of two or more symbols.

Many digital communication links use only one bit per symbol; a binary '0' is represented by one symbol (e.g., an electrical voltage or current signal within a first range), and a binary '1' by another symbol (e.g., an electrical voltage or current signal within a second range), but higher-order signal constellations are known and frequently used. In 4-level pulse amplitude modulation (PAM4), each symbol interval may carry any one of four symbols, typically denoted as −3, −1, +1, and +3. Each PAM4 symbol can thus represent two binary bits.

Channel non-idealities produce dispersion often causing each symbol to perturb its neighboring symbols, an effect known as inter-symbol interference (ISO. ISI can make it difficult for the receiving device to determine which symbols were sent in each interval, particularly when such ISI is combined with additive noise.

To combat noise and ISI, receiving devices may employ various equalization techniques. Linear equalizers generally have to balance between reducing ISI and avoiding noise amplification. Decision Feedback Equalizers (DFE) are often preferred for their ability to combat ISI without inherently requiring noise amplification. As the name suggests, a DFE employs a feedback path to remove ISI effects derived from previously-decided symbols.

A standard textbook implementation of a DFE employs a number of cascaded circuit elements to generate the feedback signal and apply it to the received input signal, all of which must complete their operation in less than one symbol interval. At a symbol interval of 100 picoseconds (for a symbol rate of 10 gigabaud), this implementation is very challenging with currently available silicon semiconductor processing technologies. Even data rates around a few gigabaud per second can be difficult to achieve due to performance limitations of silicon-based integrated circuits.

Accordingly, certain proposed designs such as those disclosed in U.S. Pat. No. 8,301,036 ("High-speed adaptive decision feedback equalizer"), U.S. Pat. No. 9,071,479 ("High-speed parallel decision feedback equalizer"), and U.S. Pat. No. 9,935,800 ("Reduced Complexity Precomputation for Decision Feedback Equalizer"), employ alternative implementations that exploit the use of precompensation modules. Each of these references is hereby incorporated herein by reference in their entireties. However, as symbol rates continue to increase, the ISI worsens, challenging even the performance of these proposed equalizers. One issue in particular is clock-signal recovery. While high-performance clock recovery modules are known, they are complex and would consume an inordinate amount of power at the sampling rates contemplated herein.

SUMMARY

Accordingly, there are disclosed herein clock recovery modules providing improved performance with only limited complexity and power requirements. In one illustrative embodiment, a clock recovery method includes: oversampling a receive signal to obtain mid-symbol interval (MSI) samples and between-symbol interval (BSI) samples; processing at least the MSI samples to obtain symbol decisions; filtering the symbol decisions to obtain BSI targets; determining a timing error based on a difference between the BSI samples and the BSI targets; and deriving from the timing error a clock signal for said oversampling.

In another illustrative embodiment, a high-speed receiver includes: an analog to digital converter, an equalizer, a target filter, an error calculator, and a clock generator. The analog to digital converter oversamples a receive signal to obtain mid-symbol interval (MSI) samples and between-symbol interval (BSI) samples. The equalizer processes at least the MSI samples to obtain symbol decisions. The target filter operates on the symbol decisions to provide BSI targets. The error calculator determines a timing error based on a difference between the BSI samples and the BSI targets. The clock generator adjusts a clock signal for the analog to digital converter based on the timing error.

Each of the foregoing embodiments may be implemented alone or together with any one or more of the following optional features in any suitable combination: 1. limiting the determination of timing error to BSI samples between symbols of maximal magnitude and opposite sign. 2. limiting the determination of timing error to BSI samples having BSI targets below a given threshold. 3. said deriving includes: filtering the timing error to obtain a control voltage; and applying the control voltage to a voltage controlled oscillator. 4. said filtering the symbol decisions includes: obtaining filter coefficients by correlating BSI samples to symbol decisions within a window; and applying the filter coefficient to obtain the BSI targets. 5. said obtaining includes limiting said correlating to windows having adjacent symbols decisions of maximal magnitude and opposite sign. 6. said processing includes using a decision feedback equalizer, and wherein said symbol decisions are obtained from a PAM4 constellation. 7. the error calculator includes a qualifier that limits the determination of timing error to BSI samples between symbols of maximal magnitude and opposite sign. 8. the qualifier further limits the determination of timing error to BSI samples having BSI targets below a given threshold. 9. the clock generator includes: a loop filter that derives a control voltage from the timing error; and a voltage controlled oscillator that produces the clock signal at a frequency controlled by the control voltage. 10. a correlator that obtains coefficients for the target filter by correlating BSI samples to symbol decisions within a window. 11. the equalizer comprises a decision feedback equalizer that obtains said symbol decisions from a PAM4 constellation.

Note that the disclosure is not limited to the specific embodiments recited here, described below, and/or shown in the drawings. Rather, the disclosure extends also to the alternative forms, equivalents, and modifications that one of ordinary skill would discern in view of the state of the art on the filing date hereof, including all those that are encompassed within the scope of the appended claims.

DETAILED DESCRIPTION

Figure 1:
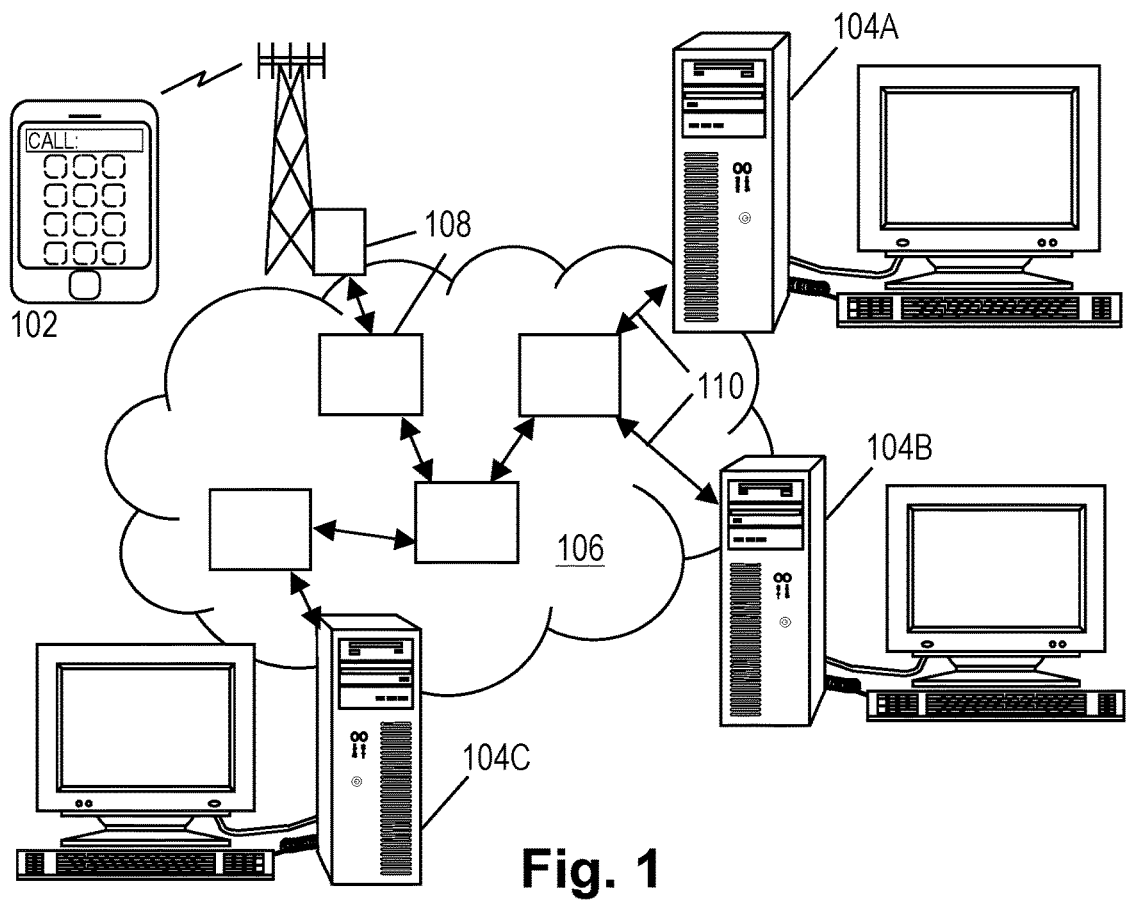
FIG. 1 shows an illustrative computer network.

The disclosed apparatus and methods are best understood in the context of the larger environments in which they operate. Accordingly, FIG. 1 shows an illustrative communications network 100 including wireless mobile devices 102 and computer systems 104A-C coupled via a routing network 106. The routing network 106 may be or include, for example, the Internet, a wide area network, a local area network, a telephone network, or a cable network. In FIG. 1, the routing network 106 includes a network of equipment items 108, such as switches, routers, wireless access points, and the like. At least some of the equipment items 108 are connected to one another, and to the computer systems 104A-C, via point-to-point communication links 110 that transport data between the various network components.

Figure 2:
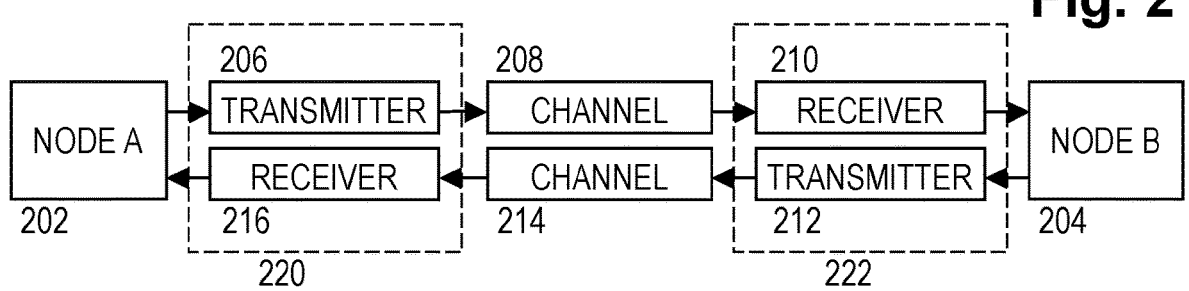
FIG. 2 is a block diagram of an illustrative point-to-point communication link.

FIG. 2 is a diagram of an illustrative point-to-point communication link that may be representative of links 110 in FIG. 1. The illustrated embodiment includes a first node 202 ("Node A") in communication with a second node 204 ("Node B"). Nodes A & B can each be, for example, any one of mobile devices 102, equipment items 108, computer systems 104A-C, or other sending/receiving devices suitable for high-rate digital data communications.

Coupled to Node A is a transceiver 220, and coupled to Node B is a transceiver 222. Communication channels 208 and 214 extend between the transceivers 220 and 222. The channels 208 and 214 may include, for example, transmission media such as fiber optic cables, twisted pair wires, coaxial cables, backplane transmission lines, and wireless communication links. (It is also possible for the channel to be a magnetic or optical information storage medium, with the write-read transducers serving as transmitters and receivers.) Bidirectional communication between Node A and Node B can be provided using separate channels 208 and 214, or in some embodiments, a single channel that transports signals in opposing directions without interference.

A transmitter 206 of the transceiver 220 receives data from Node A and transmits the data to the transceiver 222 via a signal on the channel 208. The channel signal may be, for example, an electrical voltage, an electrical current, an optical power level, a wavelength, a frequency, or a phase value. A receiver 210 of the transceiver 222 receives the signal via the channel 208, uses the signal to reconstruct the transmitted data, and provides the data to Node B. Similarly, a transmitter 212 of the transceiver 222 receives data from Node B, and transmits the data to the transceiver 220 via a signal on the channel 214. A receiver 216 of the transceiver 220 receives the signal via the channel 214, uses the signal to reconstruct the transmitted data, and provides the data to Node A. Though the present disclosure is applicable to systems for both wired and wireless communications, optical signaling is discussed in detail below as a specific example to aid understanding. Examples specific to copper wire signaling and wireless radio, microwave, or infrared signaling are also contemplated and will be evident to those of ordinary skill having benefit of the present disclosure.

Figure 3:
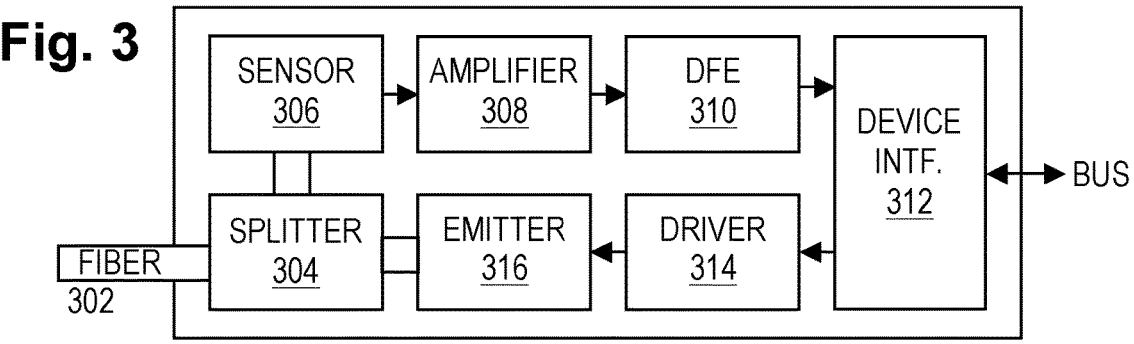
FIG. 3 is a block diagram of an illustrative fiber optic interface module.

FIG. 3 illustrates a transceiver embodiment specific to fiber optic signaling with a function block diagram of an illustrative fiber optic interface module. The optical fiber 302 couples to a splitter 304 which creates two optical paths to the fiber: one for receiving and one for transmitting. A sensor 306 is positioned on the receiving path to convert one or more received optical signals into corresponding analog (electrical) receive signals that are amplified by amplifier 308 in preparation for processing by a decision feedback equalizer (DFE) 310. The DFE 310 converts the received signal into a sequence of symbol decisions. A device interface 312 buffers the sequence of symbol decisions and, in at least some embodiments, includes forward error correction (FEC) decoding and payload extraction logic to derive a received data stream from the sequence of symbol decisions. The device interface 312 then makes the received data stream available to the host node via an internal data bus in accordance with a standard I/O bus protocol.

Conversely, data for transmission can be communicated by the host node via the bus to device interface 312. In at least some embodiments, the device interface 312 packetizes the data with appropriate headers and end-of-frame markers, optionally adding a layer of FEC coding and/or a checksum. Driver 314 accepts a transmit data stream from interface 312 and converts the transmit data stream into an analog electrical drive signal for emitter 316, causing the emitter to generate optical channel signals that are coupled via splitter 304 to the optical fiber 302.

Figure 4:
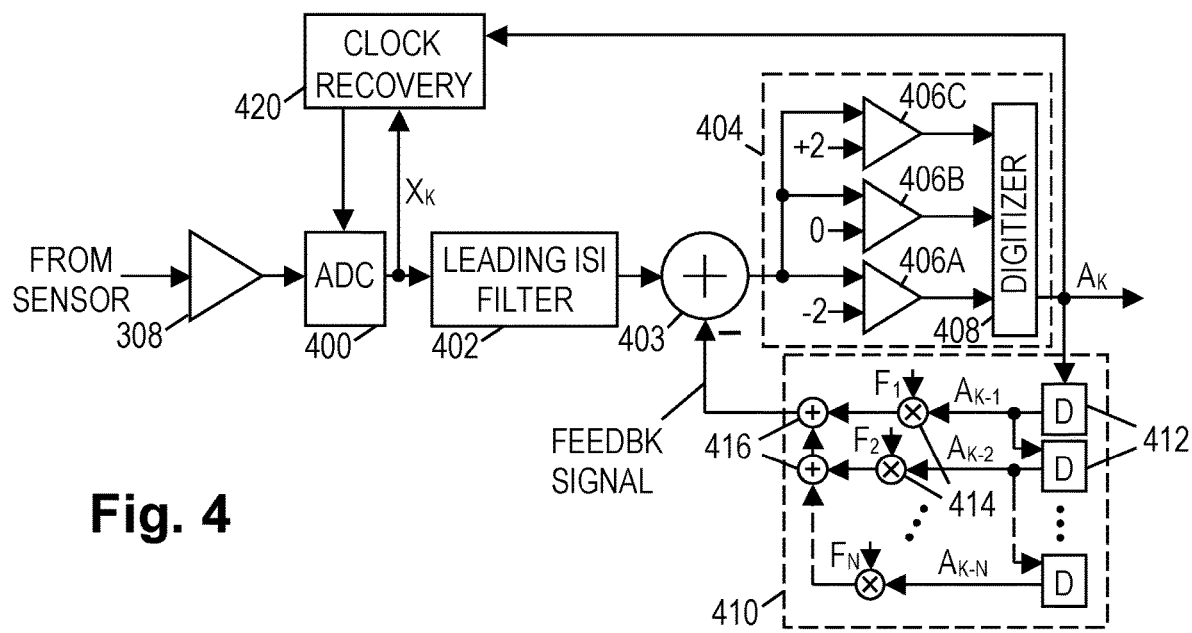
FIG. 4 is a block diagram of an illustrative decision feedback equalizer (DFE) implementation with a clock recovery module.

As previously mentioned, a DFE is included in the receive chain to combat intersymbol interference (ISI) that results from signal dispersion in the channel. FIG. 4 shows an illustrative DFE implementation including a clock recovery module 420. In FIG. 4, a low noise amplifier 308 supplies an analog receive signal to an analog-to-digital converter 400 which samples the receive signal to obtain a digital receive signal $X_k$, where k is the time index. The A/D converter 400 preferably oversamples the receive signal at least twice the symbol rate to obtain mid-symbol interval (MSI) samples approximately aligned with the maximum eye opening and to obtain between-symbol-interval (BSI) samples approximately aligned with symbol transitions including zero-crossings where applicable. The time index k will be an integer value for MSI samples and a half-integer value (e.g., 0.5, 1.5, 2.5) for BSI samples. (For emphasis, the half-integer values are at times expressed as k−0.5, where k is an integer.) As explained in greater detail below, the clock recovery module 420 will operate on the BSI samples to optimize their alignment with zero-crossings, and the MSI samples will be naturally aligned midway between BSI samples.

The DFE includes a leading ISI filter 402 that operates on the digital receive signal $X_k$ to shape the overall channel response of the system and minimize the effects of leading ISI on the current symbol. In some implementations, the leading ISI filter 402 operates solely on the MSI samples. In other implementations, the leading ISI filter 402 operates on both MSI and BSI samples. As part of the shaping of the overall channel response, the leading ISI filter 402 may also be designed to shorten the channel response of the filtered signal while minimizing any attendant noise enhancement. A summer 403 subtracts a feedback signal from the output of the leading ISI filter 402 to minimize the effects of trailing ISI on the current symbol.

A decision element 404 quantizes the combined signal to produce a stream of output data symbols (denoted $A_k$). In the illustrated example, the symbols are presumed to be PAM4 (−3, −1, +1, +3), making the decision thresholds −2, 0, and +2 for comparators 406A-406C, respectively, but bipolar signaling (−1, +1) and higher-order PAM signaling embodiments are also contemplated. (The unit for expressing symbol and threshold values is omitted for generality, but for explanatory purposes may be presumed to be volts. In practice, a scale factor will be employed.) A digitizer 408 may be included to convert the comparator outputs into a binary number representation, e.g., 00 to represent −3, 01 to represent −1, 10 to represent +1, and 11 to represent +3. Alternatively, the comparator outputs may be used as a thermometer-coded representation, e.g., 000 to represent −3, 100 to represent −1, 110 to represent +1, and 111 to represent +3. In this case digitizer 408 may be omitted.

The DFE generates the feedback signal with a feedback filter 410 having a series of delay elements 412 (e.g., latches, flip flops, or registers) that store the recent output symbol decisions ($A_{k-1} \ldots A_{k-N}$, where N is the number of filter coefficients $f_i$). A set of multipliers 414 determines the product of each symbol with a corresponding filter coefficient, and a series of summers 416 combines the products to obtain the feedback signal. A different filter coefficient '$f_i$' is provided to each of the multipliers 414, where i=1, 2, . . . , N. Each of the multipliers 414 produces a product of the associated recent symbol decision and filter coefficient. As an aside, we note here that while the circuitry for the filters 402 and 410 is illustrated as operating on digital signals, they can alternatively be implemented as operating on analog signals. The clock recovery module 420 would be applied at whichever point the sampling is performed.

The clock recovery module 420 operates by combining the BSI samples with the recent output symbol decisions to align the BSI sampling times with the symbol transitions. In the illustrative embodiment of FIG. 5, a target filter 502 estimates a target BSI sample value as:

$$\hat{t}_{k-0.5} = \Sigma_{i=-R}^{L} a_{k-i} f_{i-0.5}$$

where L and R define the left extent (older end) and right extent (newer end) of a recent symbol decision window that includes a current symbol decision $a_k$. In an example provided below, L=4 and R=1, for a window span of six symbol intervals.

A subtractor 504 determines a discrepancy d between the target and the BSI sample $x_{k-0.5}$:

$$d_{k-0.5} = x_{k-0.5} - \hat{t}_{k-0.5}$$

which can be used to calculate a timing error e. For example, an error calculator can combine the discrepancy with the symbol decisions as follows:

$$e_{k-0.5} = (a_k - a_{k-1})(x_{k-0.5} - \hat{t}_{k-0.5}) = (a_k - a_{k-1})d_{k-0.5}$$

Other options will be discussed further below.

Depending on the output of a qualifier module 510, which we will return to momentarily, a multiplexer 508 provides the timing error to a loop filter 512. The loop filter combines multiple timing error values to form a control voltage for a voltage controlled oscillator 514. If the timing error is consistently positive (indicating that the sampling time is later than the optimal sampling point), the control voltage gradually increases, raising the frequency of the clock signal produced by the VCO 514 and shortening the time between samples. Conversely, if the timing error is consistent negative (indicating early sampling), the control voltage gradually decreases, lowering the frequency of the clock signal and lengthening the time between samples. So long as the filter is designed in accordance with standard practices to provide stability, the sampling clock frequency will be adjusted until the timing error converges (on average) to zero.

Certain data patterns tend to provide much more accurate timing error measurements than others. More specifically, a symbol transition from a maximum value to a minimum value, or vice versa, is expected to provide the sharpest possible zero-crossing point (once ISI from other symbols is accounted for by subtracting the target filter output).

Accordingly, at least some embodiments of the clock recovery module 420 employ a qualifier module 510, which limits which data patterns are used to calculate timing errors for the loop filter 512. In a PAM4 system, qualifier module 510 may impose a requirement for $a_k a_{k-1} = -9$. In a bipolar system, the requirement might be for $a_k a_{k-1} = -1$. If this requirement is not satisfied, the qualifier 510 may control the multiplexer 508 to substitute a zero for the calculated timing error.

The qualifier module 510 may optionally impose additional requirements. For example, if the calculated target value $t_{k-0.5}$ is too large (e.g., greater than 0.8), this may indicate excessive intersymbol interference. Thus the qualifier module may impose a second requirement that the target value be less than a given threshold, and if it is not, the qualifier module 510 may substitute zero for the calculated timing error.

We note here that the data pattern requirement may lead to certain simplifications of the target filter and/or the error calculation. It may often be the case that $f_{0.5} = f_{-0.5}$, and if the qualifier 510 constrains $a_k$ and $a_{k-1}$ to have equal magnitude with opposite sign, their ISI contributions to the target BSI value will cancel out. Thus some target filter implementations may omit these filter taps.

To provide an example, suppose target filter 502 has the following tap values:

$$\{f_{-1.5}, f_{-0.5}, f_{0.5}, f_{1.5}, f_{2.5}, f_{3.5}\} = \{-0.02, 0.18, 0.18, 0.019, 0.006, 0.003\}.$$

If at k=0 the qualifier requires that $a_0 = -a_{-1}$, the remaining ISI that is modeled at zero crossing becomes $$\hat{t}_{-0.5} = f_{-1.5} a_1 + f_{1.5} a_{-2} + f_{2.5} a_{-3} + f_{3.5} a_{-4}.$$

Thus, a filter with coefficients {−0.02, 0, 0.019, −0.006, 0.003} can be adopted with the decision symbol $\{a_k\}$ as input. A preset threshold t is compared with $|\hat{t}_{-0.5}|$ such that the timing information shall be disregarded if $|\hat{t}_{-0.5}| > t$.

Another potential simplification arises in the calculation of the error $e_{k-0.5}$ if the qualifier 510 essentially constrains the magnitude of $(a_k - a_{k-1})$. In this case the error calculation may simply use $a_k$ or the sign of $a_k$ instead of $(a_k - a_{k-1})$, e.g., the error calculator may calculate the timing error as:

$$e_{k-0.5} = \text{sign}(a_k) d_{k-0.5}$$

Figure 5:
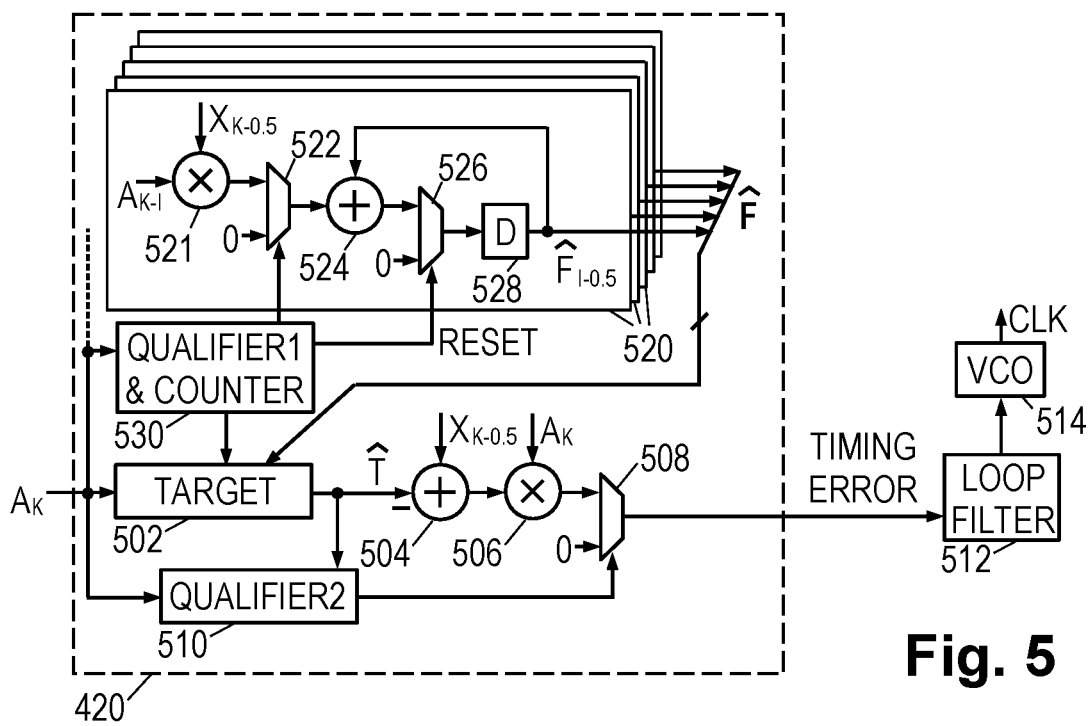
FIG. 5 is a block diagram of an illustrative clock recovery module.

Alternatively, because the qualifier constrains the value of $a_{k-1}$ relative to $a_k$, the value or sign of $a_{k-1}$ may be employed in the calculation, such that the error calculator can be implemented as a simple multiplier 506 (FIG. 5).

The clock recovery module 420 further includes correlators 520 to derive the coefficients f for use in the target filter 502. A qualifier module 530 may also be employed here to limit the operation of the correlators to the data patterns that provide the most useful timing information. Thus qualifier module 530 may impose a requirement for $a_k a_{k-1} = -9$ (in PAM4 systems) or $a_k a_{k-1} = -1$ (in bipolar systems), causing multiplexer 522 to substitute zero when the requirement is not satisfied.

Qualifier module 530 may include a counter to track the number of correlation operations used to estimate the target filter coefficients, and when a desired number is reached, the qualifier module 530 may cause the target filter 502 to begin using the newest set of coefficient estimates, and may further reset the correlators 520 to begin a new coefficient estimation cycle.

The set of correlators 520 includes a correlator for each of the target filter coefficients $f_{i-0.5}$, $-R \leq i \leq L$. Each correlator 520 includes a multiplier 521 that determines the product of $a_{k-i} x_{k-0.5}$ for the associated value of i. When the requirements of qualifier module 530 are satisfied, a multiplexer 522 passes the product to a summer 524, which adds the product to the accumulated value stored in latch 528. Unless the qualifier module 530 is resetting the correlators, the multiplexer 526 stores the combined sum in the latch 528. Once the desired number of correlation operations are performed the value stored in latch converges to an expected correlation value $$\hat{f}_{i-0.5} = E\{x_{k-0.5} a_{k-i}\}$$

albeit with scale factor given by the maximum value of the counter. Since the scale factor is fixed, it can be taken into account without actually dividing the accumulated sum by the scale factor to calculate the average.

In one contemplated variation, the multiplier 521 determines the product $a_{k-i} \text{sign}(x_{k-0.5})$. This variation offers a reduced-complexity implementation, but under additive white noise conditions is expected to yield the desired correlation value, as long as the standard deviation of the noise is larger than the expected magnitude of between-interval ISI.

Thus, as the channel or optimized receiver parameters vary, the expected BSI target values are tracked for whichever data patterns prove most useful, and there is no need to verify that any preselected symbol sequences are free of excessive ISI at the symbol transitions. Thus the proposed clock recovery module is expected to outperform fixed pattern filtering, which would not be able to adapt to such variation and in any event would likely offer fewer opportunities for timing error determination. Consequently the jitter performance is improved while maintaining a low-complexity implementation for the clock recovery module.

Figure 6:
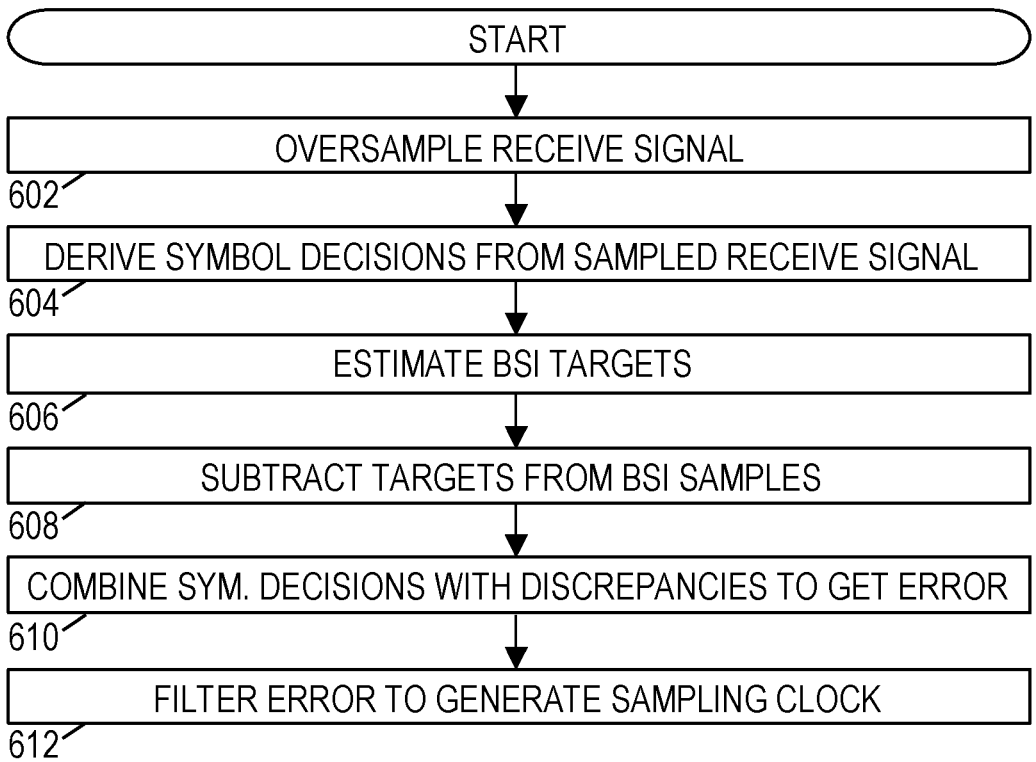
FIG. 6 is a flowchart of an illustrative method for high speed equalization.

FIG. 6 is a flowchart of an illustrative clock recovery method that may be implemented as a part of any DFE or application-specific integrated circuit providing high-speed data receiver functionality. The clock recovery method generates a sampling clock signal "CLK" by combining the sequence of symbol decisions $A_k$ with the sequence of BSI samples. The sampling clock signal may be supplied to the analog-to-digital converter (or other sampling element) to specify sampling instants and to drive the baud-rate components downstream of the sampling element.

The method of FIG. 6 begins in block 602 with the sampling element oversampling (and preferably digitizing) the analog receive signal to provide MSI and BSI samples. In block 604, an equalizer such as a DFE derives symbol decisions from at least the MSI samples. In block 606, a target filter operates on at least the BSI samples to estimate BSI target values. In block 608, a BSI target value is subtracted from each BSI sample to determine discrepancies. In block 610, the discrepancies are combined with the symbol decisions to obtain timing errors. In block 612, the timing errors are filtered to control a frequency and phase of the sampling clock signal. In at least some preferred embodiments, the timing errors employed selectively for generating the sampling clock signal, e.g., to exclude errors associated with undesirable data patterns.

Numerous alternative forms, equivalents, and modifications will become apparent to those skilled in the art once the above disclosure is fully appreciated. For example, the symbol set for the receive signal may be bipolar, PAM4, or PAM8, and other constellations are also possible. The described clock recovery module 420 operates on BSI samples provided by the A/D converter 400, but the disclosed principles can also be applied to BSI samples at the output of the leading ISI filter 402 or the summer 403, though this would require the leading ISI filter 402 and potentially the feedback filter 410 to operate at twice the symbol rate.

Though the illustrated examples employ decision-feedback equalization, this is not a requirement. Linear equalizers, maximum likelihood sequence estimators, and other known equalizers may be employed to derive symbol decisions from the sampled receive signal. It is intended that the claims be interpreted to embrace all such alternative forms, equivalents, and modifications that are encompassed in the scope of the appended claims.

What is claimed is:

1. A clock recovery method that comprises:
   oversampling a receive signal to obtain mid-symbol interval (MSI) samples and between-symbol interval (BSI) samples;
   processing at least the MSI samples to obtain symbol decisions;
   filtering the symbol decisions to obtain BSI targets;
   determining a timing error based on a difference between the BSI samples and the BSI targets; and
   deriving from the timing error a clock signal for said oversampling.

2. The method of claim 1, wherein said determining the timing error includes limiting the determination of the timing error to BSI samples between symbols of maximal magnitude and opposite sign.

3. The method of claim 2, wherein said determining the timing error further includes limiting the determination of the timing error to BSI samples having BSI targets below a given threshold.

4. The method of claim 1, wherein said deriving includes:
   filtering the timing error to obtain a control voltage; and
   applying the control voltage to a voltage controlled oscillator.

5. The method of claim 1, wherein said filtering the symbol decisions includes:
   obtaining filter coefficients by correlating BSI samples to symbol decisions within a window; and
   applying the filter coefficients to obtain the BSI targets.

6. The method of claim 5, wherein said obtaining includes limiting said correlating to windows having adjacent symbols decisions of maximal magnitude and opposite sign.

7. The method of claim 1, wherein said processing includes using a decision feedback equalizer, and wherein said symbol decisions are obtained from a PAM4 constellation.

8. A high-speed receiver that comprises:
   an analog to digital converter that oversamples a receive signal to obtain mid-symbol interval (MSI) samples and between-symbol interval (BSI) samples;

an equalizer that processes at least the MSI samples to obtain symbol decisions;

a target filter that operates on the symbol decisions to provide BSI targets;

an error calculator circuit that determines a timing error based on a difference between the BSI samples and the BSI targets; and a clock generator that adjusts a clock signal for the analog to digital converter based on the timing error.

9. The high-speed receiver of claim 8, wherein the error calculator circuit includes a qualifier that limits the determination of the timing error to BSI samples between symbols of maximal magnitude and opposite sign.

10. The high-speed receiver of claim 9, wherein said qualifier further limits the determination of the timing error to BSI samples having BSI targets below a given threshold.

11. The high-speed receiver of claim 8, wherein the clock generator includes:

a loop filter that derives a control voltage from the timing error; and a voltage controlled oscillator that produces the clock signal at a frequency controlled by the control voltage.

12. The high-speed receiver of claim 8, further comprising:

a correlator that obtains coefficients for the target filter by correlating BSI samples to symbol decisions within a window.

13. The high-speed receiver of claim 12, wherein the correlator limits said correlating to windows having adjacent symbols decisions of maximal magnitude and opposite sign.

14. The high-speed receiver of claim 8, wherein the equalizer comprises a decision feedback equalizer that obtains said symbol decisions from a PAM4 constellation.

* * * * *